(12) United States Patent
Aslandere et al.

(10) Patent No.: US 12,468,870 B2
(45) Date of Patent: Nov. 11, 2025

(54) METHOD AND SYSTEM FOR CARRYING OUT A SIMULATION

(71) Applicant: Ford Global Technologies, LLC, Dearborn, MI (US)

(72) Inventors: Turgay Isik Aslandere, Aachen (DE); Eduardo Perez Guzman, Aachen (DE); Frederik De Smet, Zonhoven (BE); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 969 days.

(21) Appl. No.: 17/578,672

(22) Filed: Jan. 19, 2022

(65) Prior Publication Data
US 2022/0245308 A1 Aug. 4, 2022

(30) Foreign Application Priority Data
Feb. 3, 2021 (DE) .......................... 102021102460.9

(51) Int. Cl.
*G06F 30/27* (2020.01)
(52) U.S. Cl.
CPC .................................. *G06F 30/27* (2020.01)
(58) Field of Classification Search
CPC ....... G06F 30/27; G06F 2111/08; G06N 3/08; G06N 3/044
See application file for complete search history.

(56) References Cited

U.S. PATENT DOCUMENTS

| | | |
|---|---|---|
| 2008/0098207 A1 | 4/2008 | Reid et al. |
| 2019/0042859 A1 | 2/2019 | Schubert et al. |
| 2019/0066133 A1 | 2/2019 | Cotton |
| 2020/0160153 A1* | 5/2020 | Elmoznino ............. G06T 11/60 |
| 2020/0311869 A1* | 10/2020 | Reaungamornrat .. G06T 3/4046 |
| 2022/0161815 A1* | 5/2022 | Van Beek ......... B60W 60/0013 |
| 2022/0318956 A1* | 10/2022 | Xu ............................ G06T 5/50 |

FOREIGN PATENT DOCUMENTS

| | | |
|---|---|---|
| CN | 109284280 A | 1/2019 |
| DE | 102018200816 B3 | 2/2019 |

OTHER PUBLICATIONS

Tran et al., "Gotta Adapt 'Em All: Joint Pixel and Feature-Level Domain Adaptation for Recognition in the Wild" (CVPR), 2019, pp. 2672-2681 [retrieved from https://openaccess.thecvf.com/content_CVPR_2019/papers/Tran_Gotta_Adapt_Em_All_Joint_Pixel_and_Feature-Level_Domain_Adaptation_CVPR_2019_paper.pdf].*

(Continued)

*Primary Examiner* — Brian W Wathen
(74) *Attorney, Agent, or Firm* — Christopher Storms; Brooks Kushman P.C.

(57) ABSTRACT

A simulation includes loading a first generator of a Cycle Generative Adversarial Network (CycleGAN) with a model dataset during a training phase in order to train the first generator in cooperation with a first discriminator of the CycleGAN assigned to the first generator, and loading a second generator of the CycleGAN with a hardware dataset in order to train the second generator in cooperation with a second discriminator of the CycleGAN assigned to the second generator, and loading the first generator with an input dataset during an operational phase in order to provide an output dataset.

11 Claims, 7 Drawing Sheets

(56) References Cited

OTHER PUBLICATIONS

Zhu et al., "Semi-supervised method for image texture classification of pituitary tumors via CycleGAN and optimized feature extraction" BMC Med Inform Decis Mak 20, 215 (2020). [retrieved from https://doi.org/10.1186/s12911-020-01230-x].*
Almahairi, A. et al., "Augmented CycleGAN: Learning Many-to-Many Mappings from Unpaired Data," arXiv:1802.10151v2 [cs. LG], Jun. 18, 2018, 10 pages.
"Test Automation Software," dSpace, www.dSpace.com, 2020, 36 pages.
Yazdanbakhsh, A, et al., "GANAX," Proceedings of the 45th Annual International Symposium on Computer Architecture, Jun. 2018, 4 pages.
Lu, Y., et al., "Attribute-Guided Face Generation Using Conditional CycleGAN," The Hong Kong University of Science and Technology, Nov. 14, 2018, 16 pages.
Yazdanbakhsh, A. et al., "GANAX: A UnifiedMIMD-SIMD Acceleration for Generative Adversarial Networks," Proceedings of the 45th International Symposium on Computer Architecture, 2018, 12 pages.

\* cited by examiner

METHOD AND SYSTEM FOR CARRYING OUT A SIMULATION

CROSS-REFERENCE TO RELATED APPLICATIONS

This patent application claims priority to German Patent Application No. 102021102460.9, filed Feb. 3, 2021, which is hereby incorporated by reference in its entirety.

BACKGROUND

The present disclosure relates to a method for carrying out a simulation.

Simulations are increasingly used, e.g., in computer-aided engineering (CAE), in order to investigate the behavior of dynamic systems.

With simulations of this type, it is possible to reduce the outlay for tests within development projects.

It is known for deep neural networks to be used to carry out simulations. Systems of this type are capable of fusing a model and hardware output data, but they are not capable of transferring a probability distribution from one domain onto another. For this reason, it is not possible to generate unexpected behaviors of the hardware.

An analytical method for determining user data which are representative of a user behavior in a motor vehicle is known from DE 10 2018 2008 16 B3.

Methods for data optimization are known from CN 109248280 A.

Methods for evaluating routes of unmanned motor vehicles are known from US 2019 042859 A1.

A system which provides research results as a service is known from US 2019 066133 A1.

A method for analyzing data is known from US 2008 098207 A1.

Generative Adversarial Networks (GANs) are known from the publication by Yazdanbakhsh, Amir, et al. "Ganax: A unified mimd-simd acceleration for generative adversarial networks." 2018 ACM/IEEE 45th Annual International Symposium on Computer Architecture (ISCA). IEEE, 2018.

A need therefore exists to find ways to improve simulations of this type.

SUMMARY

Implementations in accordance with the present disclosure are capable of providing a method and system for carrying out a simulation, including the steps of: loading a first generator of a Cycle Generative Adversarial Network (CycleGAN) with a model dataset during a training phase in order to train the first generator in cooperation with the first discriminator of the CycleGAN assigned to the first generator, loading a second generator of the CycleGAN with a hardware dataset in order to train the second generator in cooperation with the second discriminator of the CycleGAN assigned to the second generator, and loading the first generator with an input dataset during an operational phase in order to provide an output dataset.

GANs (Generative Adversarial Networks) consist of two neural networks which carry out a zero-sum game. The first neural network, the generator, creates candidate datasets, while the second neural network, the discriminator, evaluates the candidate datasets. The generator typically maps latent variables from a vector onto the desired result space. The aim of the generator is to learn to generate results according to a specific distribution. Conversely, the discriminator is trained to distinguish between the results of the generator and the data from the real, predefined distribution. The target function of the generator consists in generating results which the discriminator cannot distinguish. The generated distribution is thereby intended to gradually converge with the real distribution.

A CycleGAN has two generators and two discriminators. During the training phase, the first generator transforms the model dataset into a model hardware domain, and the second generator transforms a hardware dataset into a hardware model domain.

During the training phase, hardware data are generated to configure the first generator and model data are generated to configure the second generator. On completion of the training phase, the first generator is configured with the hardware data as the model hardware generator, while the second generator is configured as the hardware model generator.

During the operational phase, only the first generator is loaded with the input data set and then provides the output dataset.

The output dataset is indicative of a behavior of hardware components. In other words, the output dataset can be regarded as a temporal sequence of values representative of the behavior of hardware components.

The hardware dataset can similarly be regarded as a temporal sequence of values representative of the behavior of hardware components which are used with the aforementioned hardware components, such as e.g. the hardware components of a 1.5-liter turbo-charged internal combustion engine and a 1.0-liter turbo-charged internal combustion engine.

Probability distributions of features are therefore transformed in unpaired datasets with CycleGANs.

Apart from the fact that fewer experimental tests need to be carried out, it thus becomes possible, for example, to use data from test runs with a 1.0-liter turbo-charged internal combustion engine for gasoline engines (e.g. data from test bed experiments) to create predicted experimental data for a 1.5-liter turbo-charged internal combustion engine using the model-based systems together with GANs. A further example concerns predictions of real driving emissions (RDEs), wherein the available RDE data are used, but a different powertrain is employed.

According to one implementation, the first generator is used during the operational phase to evaluate the output dataset. To do this, the first generator can be operated in parallel with the second generator and the output data provided by both generators are compared with one another. Alternatively, it can be provided to operate the first generator inversely in order to generate comparative data from output data provided by the second generator, said comparative data being compared with the input data. The reliability of the first generator can thus be monitored during the operational phase.

According to a further implementation, a CycleGAN designed as a conditional CycleGAN and a parameterization vector for parameterizing, in particular, the output dataset, are used. The parameterization vector can be representative of a parameter of a physical system such as, for example, in the case of a spring-mass system for a spring constant of a spring and a damping coefficient. A specific direction can thus be predefined for the training during the training phase. In other words, the results of the training phase can be improved in this way.

According to a further implementation, the first generator and/or the second generator and/or the first discriminator and/or the second discriminator has/have a deep neural network. Along with an input layer and an output layer, deep neural networks or multilayer neural networks also have concealed intermediate layers whose output is not visible outside the network. One-dimensional datasets, in particular, which are representative of temporal sequences of values of a simulation can be particularly efficiently processed with deep neural networks of this type.

According to a further implementation, the first generator and/or the second generator and/or the first discriminator and/or the second discriminator has/have a recurrent neural network. In contrast to multilayer feedforward networks, recurrent neural networks also have feedback loops and therefore contain a feedback effect. Feedback loops of this type are then frequently provided with a time delay, so that, in the case of a gradual processing, the neuron outputs of the past unit can be recreated as inputs. These feedback effects provide a neural network with a dynamic behavior and equip it with a memory. One-dimensional datasets, in particular, which are representative of temporal sequences of values of a simulation can also be particularly efficiently processed with recurrent neural networks of this type.

A computer program stored on a non-transitory medium and a system further form part of an implementation.

DETAILED DESCRIPTION

Figure 1:
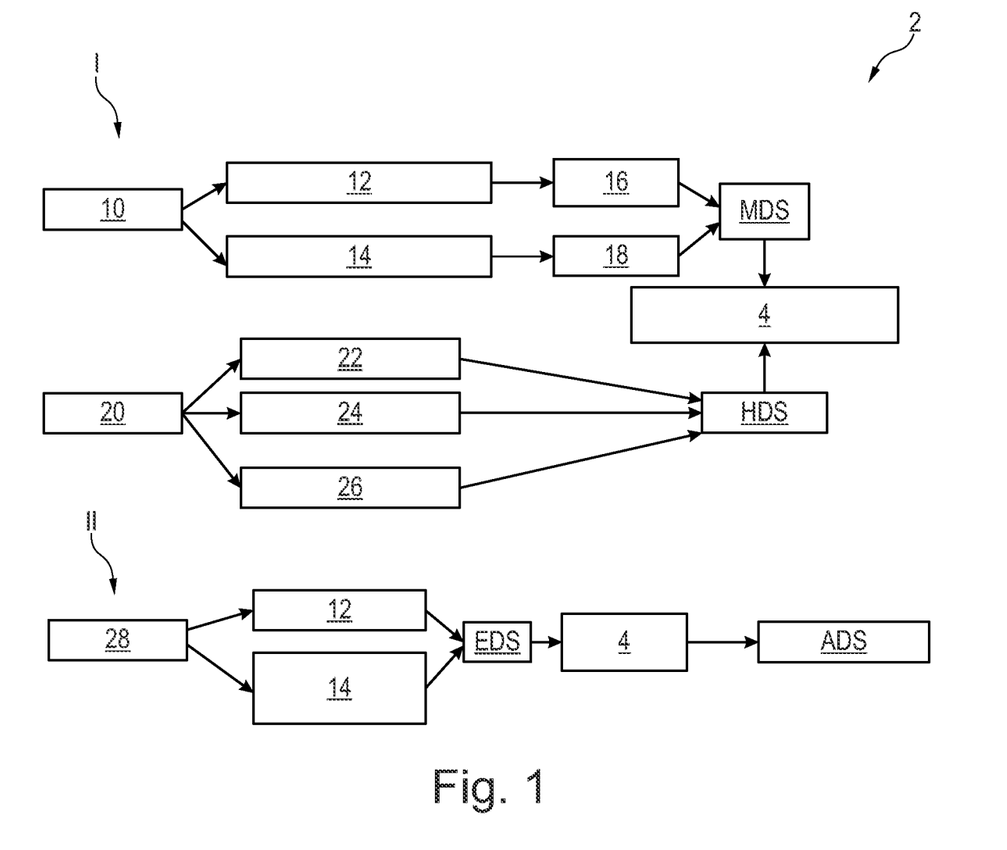
FIG. 1 shows a schematic view of a system for performing a simulation.

Reference is first made to FIG. 1, wherein a system 2 for performing a simulation is shown.

Data, for example, from test runs with a 1.0-liter turbo-charged internal combustion engine for gasoline engines (e.g. data from test bed experiments) are used to provide data for 1.5-liter turbo-charged internal combustion engine. However, data, for example, indicative of real driving emissions (RDEs) can also be provided in which available RDE data are used, but a different powertrain is employed. Generally speaking, probability distributions of features are transferred in unpaired datasets from one domain to another.

The system 2 and its components described below have hardware and/or software components for simulations of this type.

A CycleGAN 4 with an assigned training module is trained for this purpose during a training phase I.

A model 10, such as, for example, a Matlab Simulink model, is used for this purpose. Input data which are provided by emulators 12 and/or XiL (X-in-the-Loop) tests 14 are fed to the model 10.

The XiL tests 14 can be MiL (Model-in-the-Loop), SiL (Software-in-the-Loop), HiL (Hardware-in-the-Loop) and/or DiL (Drive-in-the-Loop) tests. MiL comprises the building of models for a control path and an ECU, and also a control logic with control strategies for behavior simulation, SiL comprises the creation of models in the target language of the ECU for automated testing in software developments, HiL designates a method in which an embedded system (e.g. real electronic ECU or real mechatronic component, the hardware) is connected via its inputs and outputs to an adapted counterpart, and DiL is understood to mean a combination of the HIL simulation with a driving simulator in a DiL simulation environment. In the present example embodiment, the XiL tests 14 are e.g. MiL (Model-in-the-Loop) and/or SiL (Software-in-the-Loop).

The data archived in the databases 16, 18 are then fed as the model dataset MDS to the CycleGAN 4, as will be explained in detail later.

Hardware components 20 corresponding to the model 10 are further used. The hardware components 20 can be incorporated into XiL tests, such as e.g. HiL (Hardware-in-the-Loop), can be measured on test beds 24 or used in tests 26 under real operating conditions in order to obtain further data. These data are then fed as a hardware dataset HDS to the CycleGAN 4, as will be explained in detail later.

Once the training phase I is completed, the trained CycleGAN 4 is operated as a prediction module in an operational phase II. A further model 28 is used and an input data set EDS which is fed as input to the CycleGAN 4 is generated with the emulators 12 and/or XiL tests 14, such as e.g. MiL (Model-in-the-Loop) and/or SiL (Software-in-the-Loop). The CycleGAN 4 provides an output dataset ADS.

In the present example embodiment, the output dataset ADS is indicative of a behavior of hardware components. In other words, the output dataset ADS can be regarded as a temporal sequence of values representative of the behavior of hardware components, such as e.g. for a cylinder pressure and a torque of a 1.5-litre turbo-charged internal combustion engine.

Similarly, the hardware dataset HDS can be regarded as a temporal sequence of values representative of the behavior of hardware components of a 1.0-litre turbo-charged internal combustion engine.

Figure 2:
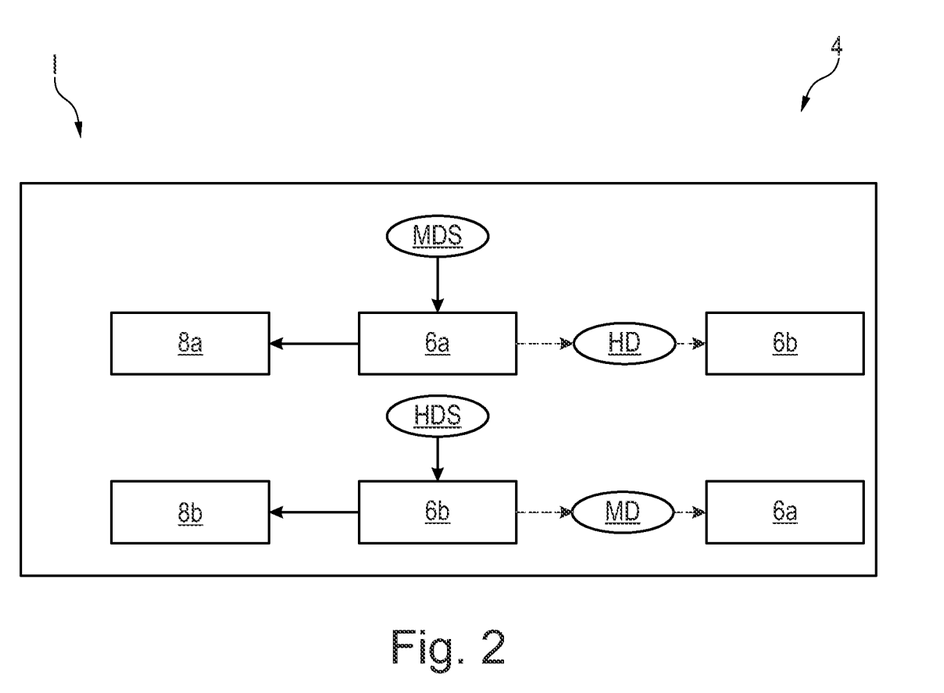
FIG. 2 shows a schematic view of further details of the system shown in FIG. 1.
Figure 3:
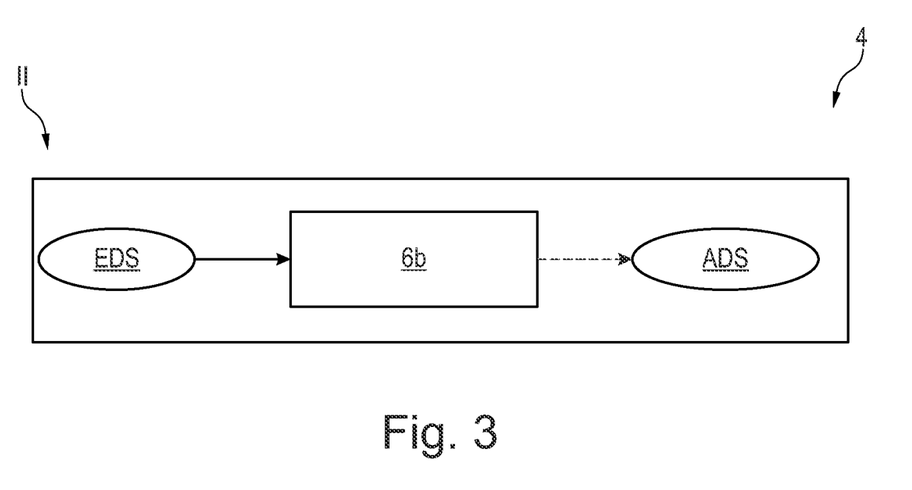
FIG. 3 shows a schematic view of further details of the system shown in FIG. 1.

Reference is now additionally made to FIG. 2.

Components of the CycleGAN 4 during the training phase I are shown. The components shown in FIG. 2 are a first generator 6a, a second generator 6b, a first discriminator 8a assigned to the first generator 6a and a second discriminator 8b assigned to the second generator 6b.

The first generator 6a and/or the second generator 6b and/or the first discriminator 8a and/or the second discriminator 8b can, in each case, have a deep neural network and/or a recurrent neural network. One-dimensional datasets, in particular, which are representative of temporal sequences of values of a simulation, can be particularly efficiently processed with deep neural and/or recurrent networks of this type.

During the training phase I, the first generator 6a transforms the model dataset MDS into a model hardware domain, and the second generator 6b transforms a hardware dataset HDS into a hardware model domain.

During the training phase I, hardware data HD are generated to configure the second generator 6b, and model data MD are generated to configure the first generator 6a. With the hardware data HD, the second generator 6b is configured as a model hardware generator, while the first generator 6a is configured as a hardware model generator.

Conversely, during the operational phase II, only the second generator 6b is loaded with the input data set EDS. It then provides the output dataset ADS.

In contrast to the present example implementation, the first generator 6a may be used during the operational phase II to evaluate the output dataset ADS. To do this, the first generator 6a can be operated in parallel with the second generator 6b and the output data provided by both generators 6a and 6b are compared with one another. Alternatively, the first generator 6a may be operated inversely in order to generate comparative data from output data provided by the second generator 6b, said comparative data being compared with the input data.

Figure 4:
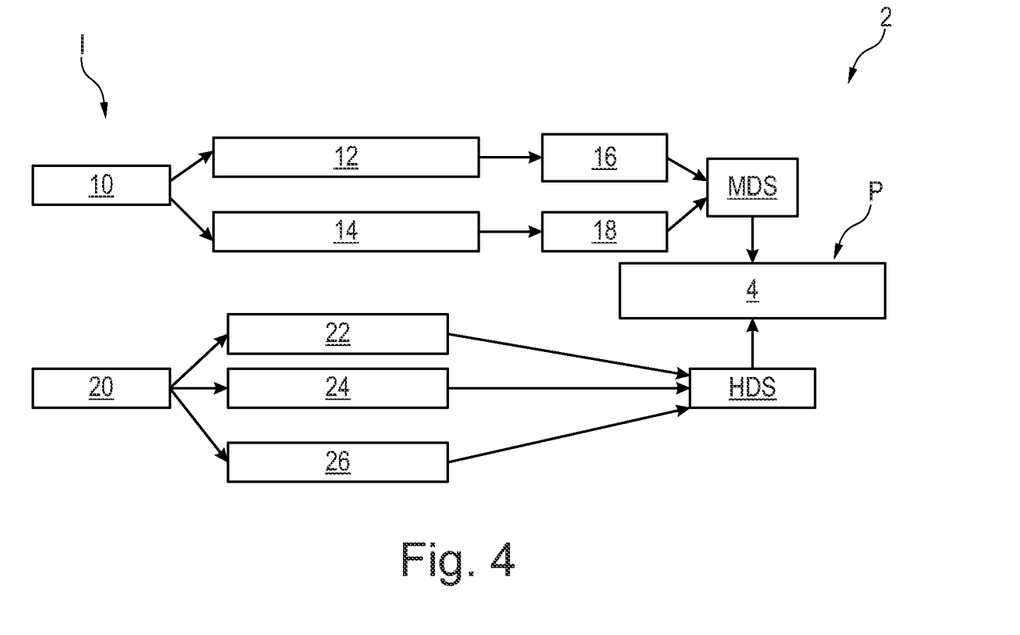
FIG. 4 shows a schematic view of further details of the system shown in FIG. 1.
Figure 5:
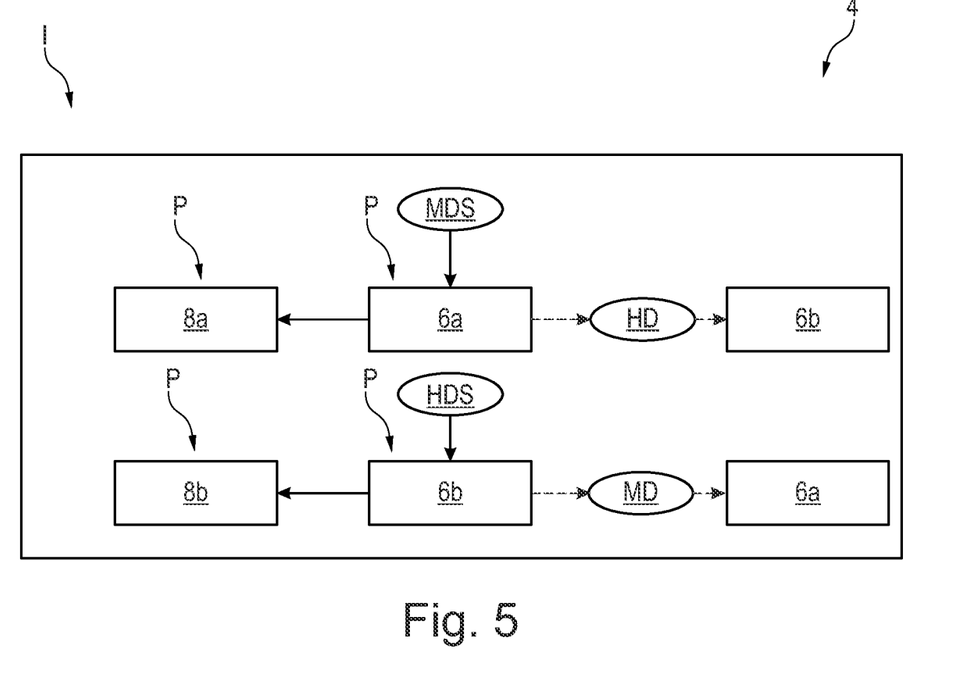
FIG. 5 shows a schematic view of further details of the system shown in FIG. 1.
Figure 6:
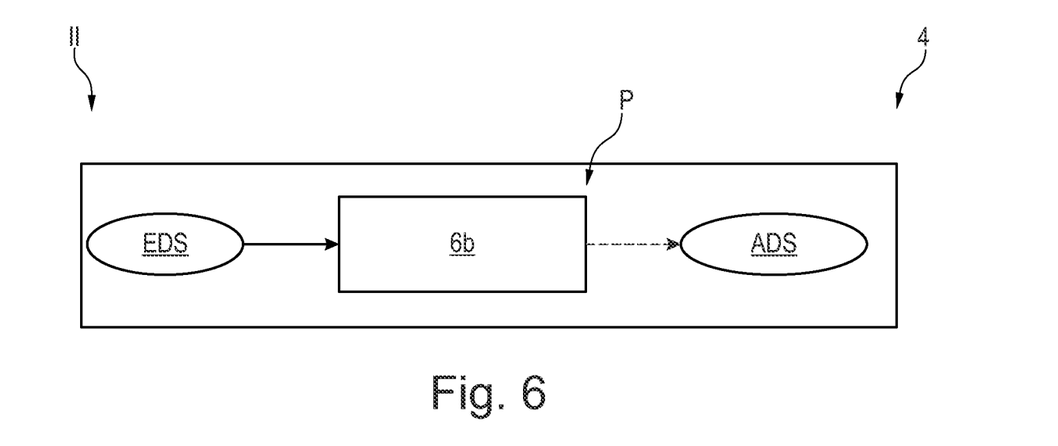
FIG. 6 shows a schematic view of further details of the system shown in FIG. 1.

Reference is now additionally made to FIGS. 4, 5, and 6.

It is shown that the CycleGAN 4 is designed in the present example implementation as a conditional CycleGAN. A parameterization vector P is used to parameterize, in particular, the output dataset ADS.

For this purpose, it is fed to the CycleGAN 4, i.e. during the training phase I to the first generator 6a, the second generator 6b, the first discriminator 8a and the second discriminator 8b. During the operational phase II, the parameterization vector P is fed to the first generator 6a.

Figure 7:
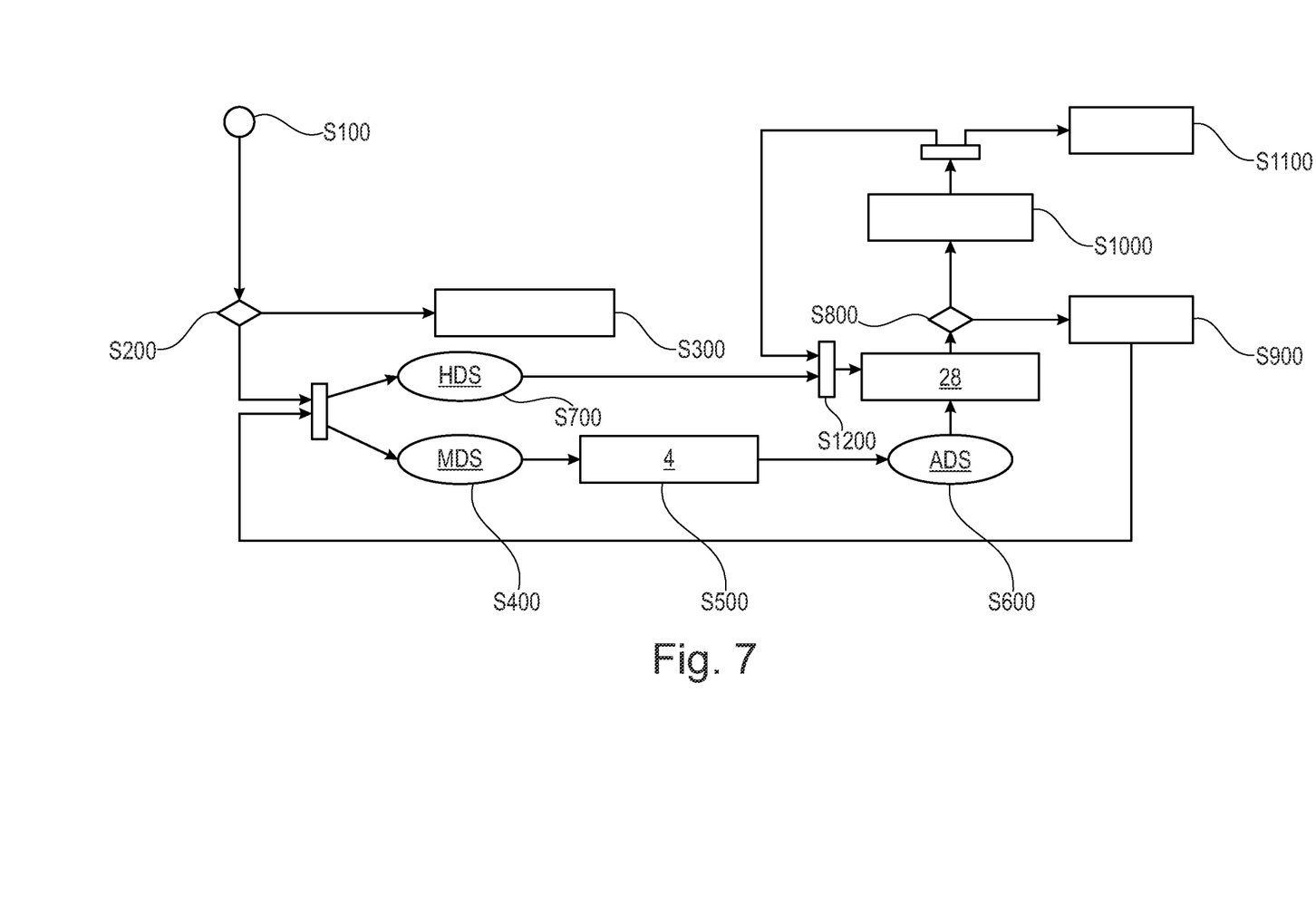
FIG. 7 shows a schematic view of a scenario in which the system shown in FIG. 1 is used.

Reference is now additionally made to FIG. 7.

In the present example implementation, the system 2 is hosted as part of a CAE environment on a server which has sufficient computing power to process GANs. The server is also capable of generating and receiving model outputs. It can be connected directly to the model 10 and/or the hardware component 20 in order to receive and process the data. It can also use the model data MD and/or hardware data HD from other systems. Ethernet/Wifi/USB, etc., can be used as connection interfaces. Automation can be implemented by software for continuous integration (e.g. Jenkins), or by e.g. dSpace Test Automation or open source software such as ASAM XiL API.

A method for performing a simulation starts at block S100.

At block S200, a check is carried out to determine whether sufficient data are present to perform the training phase I.

If not, further data are obtained at block S300.

Conversely, if the data quantity is sufficient, the model dataset MDS is input at block S400 and is fed to the CycleGAN 4 at block S500.

The output dataset ADS is then fed to a comparison unit 28 at block S600.

Furthermore, at block S700, the hardware dataset HDS is input and similarly fed to the comparison unit 28.

If the comparison carried out by the comparison unit 28 at block S800 reveals that the simulation results are accurate, the model 10 is tested at block S900 and the method is continued at blocks S400 and/or S700.

Conversely, if the comparison carried out by the comparison unit 28 reveals that the simulation results are inaccurate, the method is continued at block S1000 in which further tests are carried out.

At block S1100, a report is produced and, at block S1200, the new data are added to the existing hardware dataset HDS and are then fed together to the comparison unit 28 for a further comparison.

In other words, a check is carried out to determine whether the probability distribution matches a predicted hardware data output and the real hardware data output. However, the aim of this method is not simply to verify the hardware, but to reduce the verification effort as far as possible, e.g. a 30-hour road test instead of 50-hour road tests, etc.

In contrast to the present example implementation, the sequence of the steps can also be different. A plurality of steps can furthermore also be carried out concurrently or simultaneously. Furthermore, also in contrast to the present example implementation, individual steps can be skipped or omitted.

Apart from the fact that fewer experimental tests need to be carried out, it thus becomes possible, for example, to use data from experiments with a 1.0-liter turbo-charged internal combustion engine (e.g. data from test bed experiments) to create predicted experimental data for a 1.5-liter turbo-charged combustion engine using the model-based systems together with GANs. A further example concerns predictions of real driving emissions (RDEs), wherein the available RDE data are used, but a different powertrain is employed.

REFERENCE NUMBER LIST

2 System
4 CycleGAN
6a Generator
6b Generator
8a Discriminator
8b Discriminator
10 Model
12 Emulator
14 XiL simulation
16 Database
18 Database
20 Hardware component
22 XiL simulation
24 Test bed
26 Test
28 Comparison unit
ADS Output dataset
EDS Input dataset
HD Hardware data
HDS Hardware dataset
MD Model data
MDS Model dataset
P Parameterization vector
I Training phase
II Operational phase
S100 Step
S200 Step
S300 Step
S400 Step
S500 Step
S600 Step
S700 Step
S800 Step
S900 Step
S1000 Step
S1100 Step
S1200 Step

The invention claimed is:

1. A method for performing a simulation, comprising:
loading a first generator of a Cycle Generative Adversarial Network (CycleGAN) with a model dataset based on an emulator for a first vehicle powertrain during a training phase to train the first generator in cooperation with a first discriminator of the CycleGAN assigned to the first generator;
loading a second generator of the CycleGAN with a hardware dataset based on test bed experiments for the first vehicle powertrain to train the second generator in cooperation with a second discriminator of the CycleGAN assigned to the second generator; and loading the first generator with an input dataset based on an emulator for a second vehicle powertrain during an operational phase to provide an output dataset that simulates the second vehicle powertrain.

2. The method of claim 1, further including evaluating the output dataset with the first generator during the operational phase.

3. The method of claim 1, wherein the CycleGAN is a conditional CycleGAN and the method further includes parameterizing the output dataset with a parameterization vector.

4. The method of claim 1, wherein the first generator and/or the second generator and/or the first discriminator and/or the second discriminator include a deep neural network.

5. The method of claim 1, wherein the first generator and/or the second generator and/or the first discriminator and/or the second discriminator include a recurrent neural network.

6. A non-transitory computer-readable medium having stored thereon instructions to cause a computer to perform the method of claim 1.

7. A computer-implemented system for performing simulations, comprising:
  a computing device comprising a processor and a memory, the memory storing instructions executable by the processor, the instructions including instructions to:
  train a Cycle Generative Adversarial Network (CycleGAN), the CycleGAN including:
    a first generator,
    a second generator,
    a first discriminator assigned to the first generator, and
    a second discriminator assigned to the second generator,
  to load the first generator with a model dataset based on an emulator for a first vehicle powertrain during a training phase to train the first generator in cooperation with the first discriminator and to load the second generator with a hardware dataset in order to train the second generator in cooperation with the second discriminator, and
  to load the first generator with an input dataset based on an emulator for a second vehicle powertrain during an operational phase to provide an output dataset that simulates the second vehicle powertrain.

8. The system of claim 7, wherein the instructions include instructions to evaluate the output dataset with the first generator during the operational phase.

9. The system of claim 7, wherein the CycleGAN is designed as a conditional CycleGAN, and wherein the instructions include instructions to parameterize the output dataset with a parameterization vector.

10. The system of claim 7, wherein the first generator and/or the second generator and/or the first discriminator and/or the second discriminator include a deep neural network.

11. The system of claim 7, wherein the first generator and/or the second generator and/or the first discriminator and/or the second discriminator include a recurrent neural network.

* * * * *